United States Patent

Jacoby et al.

[11] 4,061,924
[45] Dec. 6, 1977

[54] UNIVERSAL ANGULOMETER

[76] Inventors: Marvin Jacoby, 166 Sherry Lake Apt., Conshohocken, Pa. 19428; Guido A. La Porta, 6 Heather Drive, Marlton, N.J. 08053

[21] Appl. No.: 590,051

[22] Filed: June 25, 1975

[51] Int. Cl.$^2$ .............................................. G03B 41/16
[52] U.S. Cl. .................................... 250/476; 250/475
[58] Field of Search ............... 250/476, 320, 491, 505, 250/475, 312; 354/105

[56] References Cited

U.S. PATENT DOCUMENTS

| | | | |
|---|---|---|---|
| 1,917,433 | 7/1933 | Cressler | 250/476 |
| 2,192,887 | 3/1940 | Black | 250/312 |
| 2,796,525 | 6/1957 | Nordstrom | 250/312 |
| 3,577,160 | 5/1971 | White | 250/476 |

Primary Examiner—Saxfield Chatmon, Jr.
Assistant Examiner—B. C. Anderson
Attorney, Agent, or Firm—Edelson and Udell

[57] ABSTRACT

An angulometer for recording on film at the time of exposure, both the direction of an incident radiation beam and the angle which the beam makes with the normal to the plane of the film, the angulometer consisting of a radiation transparent plate within which is fixedly mounted perpendicularly to the plane of the plate a radiation opaque small diameter cylindrical rod which has its lower end coincident with the bottom surface of the plate. A set of concentric radiation opaque angulation indicator circles having a center common with the center of the rod are formed in the bottom surface of the plate, each successive circle of larger radius corresponding to a successively larger number of degrees of inclination of a radiation beam to the axis of the rod. In use, the device is placed on the X-ray film adjacent to the part to be X-rayed and left there during exposure. When the film is developed, the shadows of the radiation opaque concentric circles and rod appear. The length of the shadow to the outermost circle to which it extends gives the angle of the X-ray beam to the rod, and the direction of the shadow gives the direction of the beam with regard to the part photographed. If the shadow falls between two circles the angle can be readily interpolated.

7 Claims, 5 Drawing Figures

U.S. Patent        Dec. 6, 1977        4,061,924
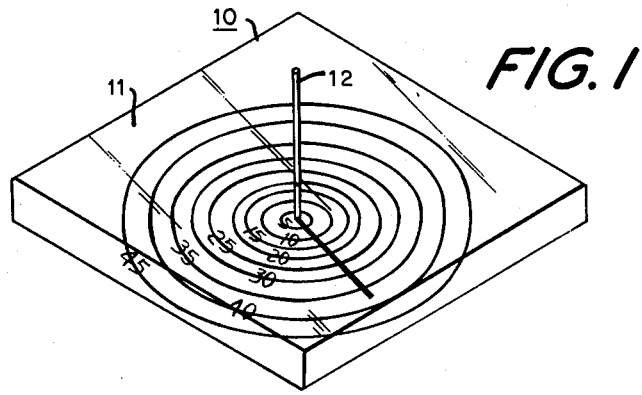
FIG. 1
FIG. 2
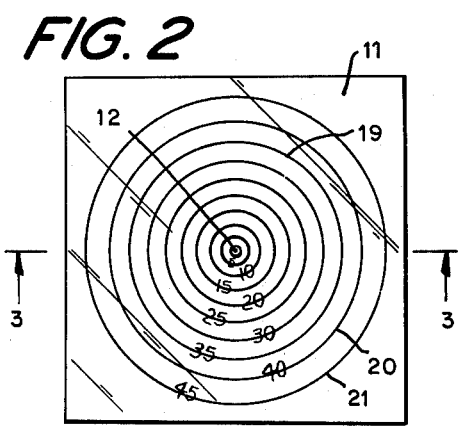
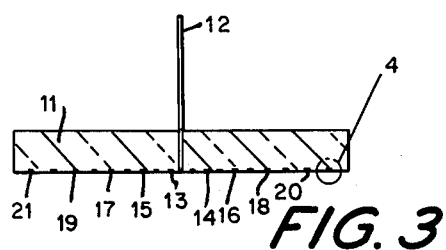
FIG. 3
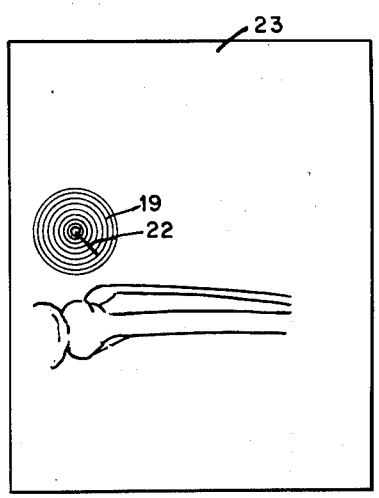
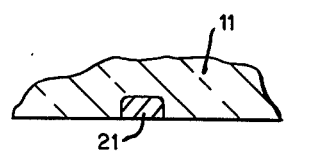
FIG. 4
FIG. 5

UNIVERSAL ANGULOMETER

This invention relates generally to radiation angulation indicators, and more particularly relates to a device for recording on a photographic film the direction of an incident X-ray beam and the angle which the beam makes with the normal to the plane of the film.

In diagnostic medical radiology, and in other fields as well, X-ray photographs are often taken with the incident X-ray beam intentionally non-perpendicular to the plane of the X-ray plate. This may be done to achieve better exposure of a part, or because the bony members to be studied cannot themselves conveniently be made to lie in a plane parallel to the X-ray plate. For example, in a standard weightbearing dorsoplantar view of the foot the X-ray beam is conventionally angulated 15° from the vertical to compensate for the downward tilt of the metatarsal bones. Any non-perpendicularity of the X-ray beam produces distortion and relative displacement of neighboring parts on the film image, and in order to interpret the film quantitatively, as is often necessary for surgery, it is essential to know the precise angle at which the beam impinged on the film.

Accordingly, it is an object of this invention to provide a novel means of recording on film at the time of exposure, both the direction of an incident radiation beam and the angle which the beam makes with the normal to the plane of the film.

It is a further object of this invention to provide an exposed X-ray film having a shadowgraph of an object that has been X-rayed and an angulation shadow indicia showing the angle at which the radiation employed in the X-ray process strikes the plane of the film.

The foregoing and other objects will appear from a reading of the following specification in conjunction with an examination of the appended drawing, wherein:

FIG. 1 is an isometric view of the novel angulometer according to the invention;

FIG. 2 is a plan view of the angulometer shown in FIG. 1;

FIG. 3 is a vertical section through the angulometer according to the invention as would be seen along line 3—3 of FIG. 2;

FIG. 4 is an enlarged fragmentary view of the portion of the angulometer base structure within the phantom circle designated 4 in FIG. 3; and FIG. 5 represents an exposed X-ray film showing the bones of the lower left leg of a human being together with the angulometer readings showing the angle at which the X-ray was taken.

In the several figures, like elements are designated by like reference characters.

Turning now to the drawing, there is seen the angulometer according to the invention designated generally as 10 and consisting of a radiation transparent plate 11 within which is fixedly mounted perpendicularly to the plane of the plate a radiation opaque small diameter cylindrical rod 12. The rod 12, which typically could be a one inch length of 1/32 inch diameter drill rod, is set within the plate 11, which typically could be a piece of ¼ inch thick suitable plastic such as plexiglass, so that its lower end coincides with the bottom surface of the plate.

Formed by any desired suitable means in the bottom surface of the plate 11 is a set of concentric radiation opaque angulation indicator circles 13 through 21 whose common center is the center of the rod 12. These circles may be formed by molding, scribing, engraving or milling, and are filled with a radiation-opaque material, such as powdered lead in a suitable binder. Adjacent to or on each circle 13 to 21 are, also formed and filled with a radiation-opaque substance, numerals which correspond to the number of degrees of inclination of the X-ray beam to the axis of the rod 12. In the illustrated case the circles 13 to 21 designate inclination angles of 5° to 45° in 5° increments.

The radii of the circles are determined from the trigonometric relationship that a rod of height, $h$, will cast a shadow of length, $r$, when in the path of radiation incident at an angle $x$, where $r$ is given by $$r = h \tan x$$

Values of $r$ for a 1" high rod and angles of incidence in 5° increments are given in Table 1. Other increments can be chosen consistent with ease of reading of the resultant images.

TABLE 1

| CIRCLE | DEGREES | RADIUS (") |
|--------|---------|------------|
| 13 | 5 | 0.087 |
| 14 | 10 | .176 |
| 15 | 15 | .268 |
| 16 | 20 | .364 |
| 17 | 25 | .466 |
| 18 | 30 | .577 |
| 19 | 35 | .700 |
| 20 | 40 | .839 |
| 21 | 45 | 1.000 |

In use, the device is placed on the X-ray film adjacent to the part to be X-rayed and left there during exposure. If the film is in the vertical plane the device may be temporarily adhered to it by a suitable substance, such as double-sided masking tape. When the film is developed the concentric circles with their angular designations will be seen together with the image, or shadow, of the metallic rod. Reading the length of the shadow to the outermost numbered circle to which it extends gives the angle of the X-ray beam to the rod 12 which is the normal to the film plane, and the direction of the shadow gives the direction of the beam with regard to the part photographed. If the shadow falls between two circles the angle can be readily interpolated. Thus the angle and direction become an integral part of the radiograph and there can be no question at a later date as to what they were at the time of exposure.

As shown in FIG. 5, the bones of the lower left leg of a human being were X-rayed from the left side at an angle of 35° to the vertical, and at a transverse angle of 45° from the knee toward the ankle. This is designated by the direction of the rod shadow 22 on the film 23 and the fact that the shadow tip extends to circle 19 which corresponds to an inclination of 35°.

Having now described the invention in connection with a particularly illustrated embodiment thereof, it will be appreciated that modifications and variations of the invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. An angulometer for recording on radiation sensitive film at the time of exposure, both the direction of an incident radiation beam and the angle which the beam makes with the normal to the plane of the film, comprising in combination, a. a flat planar radiation transparent plate;

b. a radiation opaque small diameter cylindrical rod fixedly mounted perpendicularly to the plane of said plate with its lower end extending through said plate and being coincident with the bottom surface of said plate, and c. a set of concentric radiation opaque angulation indicator circles formed in the bottom surface of said plate, said circles having their common center coincident with the longitudinal central axis of said rod, whereby, when the angulometer is placed on the radiation sensitive film adjacent to the object to be irradiated prior to radiation exposure, and irradiated together with the object, a shadow image is produced on the developed film showing the radiation opaque concentric circles and rod, the length of the rod shadow measuring the angle of the radiation to the rod, and the direction of the shadow showing the direction of the radiation with respect to the object irradiated.

2. An angulometer as set forth in claim 1 wherein a desired radius "$r$" for any of said indicator circles is calculable from the trigonometric relationship $r = h \tan x$, where "$h$" is the length of said radiation opaque rod and "$x$" is the angle which the radiation makes with the longitudinal central axis of said rod.

3. An angulometer as set forth in claim 1 wherein said radiation opaque indicator circles are narrow shallow grooves extending upward into the body of said plate from the undersurface thereof and are filled with a radiation opaque material.

4. An angulometer as set forth in claim 1 further including radiation opaque indicia associated with each of said radiation opaque indicator circles, said inidicia designating the particular angulation represented by the associated circle.

5. An exposed X-ray film having thereon a shadowgraph of an object which has been X-rayed, and an angulation shadow indicia which displays the angle at which the film exposing radiation was directed at the object whose shadowgraph appears on the exposed film.

6. An exposed X-ray film as set forth in claim 5 wherein said angulation shadow indicia comprises a series of concentric circles and a line extending radially for a distance from the common center of said circles, said circles each designating a particular angulation, and said line showing the angle of incident radiation by its direction and length of radial extent with respect to said circles.

7. An exposed X-ray film as set forth in claim 5 wherein said angulation shadow indicia is located as close to said object shadowgraph as possible in order to minimize offset error.

* * * * *